United States Patent [19]

Braunbach et al.

[11] Patent Number: 5,678,314
[45] Date of Patent: Oct. 21, 1997

[54] HAND POWER TOOL

[75] Inventors: Karl-Heinz Braunbach, Frickenhausen; David Matzo, Leinfelden-Echterdingen, both of Germany

[73] Assignee: Robert Bosch GmbH, Stuttgart, Germany

[21] Appl. No.: 578,632
[22] PCT Filed: Jun. 28, 1994
[86] PCT No.: PCT/DE94/00741
§ 371 Date: Jan. 5, 1996
§ 102(e) Date: Jan. 5, 1996
[87] PCT Pub. No.: WO95/01852
PCT Pub. Date: Jan. 18, 1995

[30] Foreign Application Priority Data

Jul. 5, 1993 [DE] Germany .................. 43 22 303.6

[51] Int. Cl.$^6$ .................. B23Q 4/00; B23Q 1/60
[52] U.S. Cl. .................. 30/372; 83/489
[58] Field of Search .................. 83/489, 574, 745; 30/372

[56] References Cited

U.S. PATENT DOCUMENTS

| 3,298,407 | 1/1967 | Scott | 83/489 |
| 5,070,562 | 12/1991 | Lentino | 83/754 X |

FOREIGN PATENT DOCUMENTS

0437753  12/1990  European Pat. Off. .

*Primary Examiner*—Douglas D. Watts
*Attorney, Agent, or Firm*—Michael J. Striker

[57] ABSTRACT

In connection with a hand-operated power tool (10), in particular a hand-operated circular saw, with a machine housing and a base plate (11, 41) with a guide groove (18, 63) for overlapping a guide rib (17) of a guide rail (16) for the guided displacement of the hand-operated power tool (10) on a workpiece, the object of providing a precisely adjustable position of the guide groove with a small manufacturing outlay is attained in that the guide groove (18, 63) is disposed in a groove holder (21, 51) which is separate in respect to the base plate (11, 41), secured against loss, displaceable in at least one direction in the plane of the base plate (11, 41), particularly transversely to the guide groove (18, 63).

21 Claims, 6 Drawing Sheets

HAND POWER TOOL

BACKGROUND OF THE INVENTION

The present invention relates to a hand-operated power tool.

A hand-operated circular saw known from EP-A2 437 753 has a base plate supporting a displaceable console to which a guide shoe with a guide groove for overlapping the guide rib of a guide rail is fastened.

The position of the console, together with the guide shoe, can be set in respect to the base plate in the plane of the latter. By means of this it is possible to displace the base plate or the saw blade for pre-notching parallel in respect to the guide groove. In a first position of the saw blade a groove of only small depth is sawn into the workpiece surface. For the subsequent cutting of the workpiece the saw blade is brought into a parallel-displaced position closely to the pre-notched groove or transiting into it. Following pre-notching, it is possible to saw an cut channel without splintering of the workpiece surface.

It is also possible with the aid of the adjustment mechanism to set the optimal position of the hand-operated power tool in respect to a guide rail, so that the guide rail can be used as chip breaker and it becomes possible to counteract the splintering of the workpiece surface even without pre-notching.

The console with the displacement means and the fastening means for the guide shoe consists of a plurality of individual parts, has a complicated structure and increases the inherent weight of the hand-operated circular saw. The assembly and production outlay for the adjustment mechanism is very great.

The guide shoe has an insert made of plastic which can be adjusted via a set screw for affecting the movement play between the guide rail and the base plate. This increases the production outlay for the hand-operated circular saw and makes handling more difficult.

Accordingly, it is an object of the present invention to provide a hand-operated power tool which avoids the disadvantages of the prior art.

In keeping with these objects and with others which will become apparent hereinafter, one feature of the present invention resides, briefly stated, in a hand-operated power tool, in which the guide groove for overlapping a guide rib of a guide rail is provided in a groove holder which is separate from a base plate, secured against loss, and is displaceable in at least one direction in the plane of the base plate, particularly transversely to the guide groove.

When the hand-operated power tool is designed in accordance with the present invention it has the advantage of great ruggedness, low weight, low production costs, constant great accuracy and comfortable safe handling.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION Of THE DRAWINGS

FIG. 6 shows a portion of the groove holder of FIG. 4, FIGS. 7 and 8 respectively show a top view of the base plate with inserted groove holder in respectively opposite extreme positions of the groove holder, and FIG. 9 is a lateral sectional view of the base plate with the groove holder.

PREFERRED EMBODIMENTS

Figure 1:
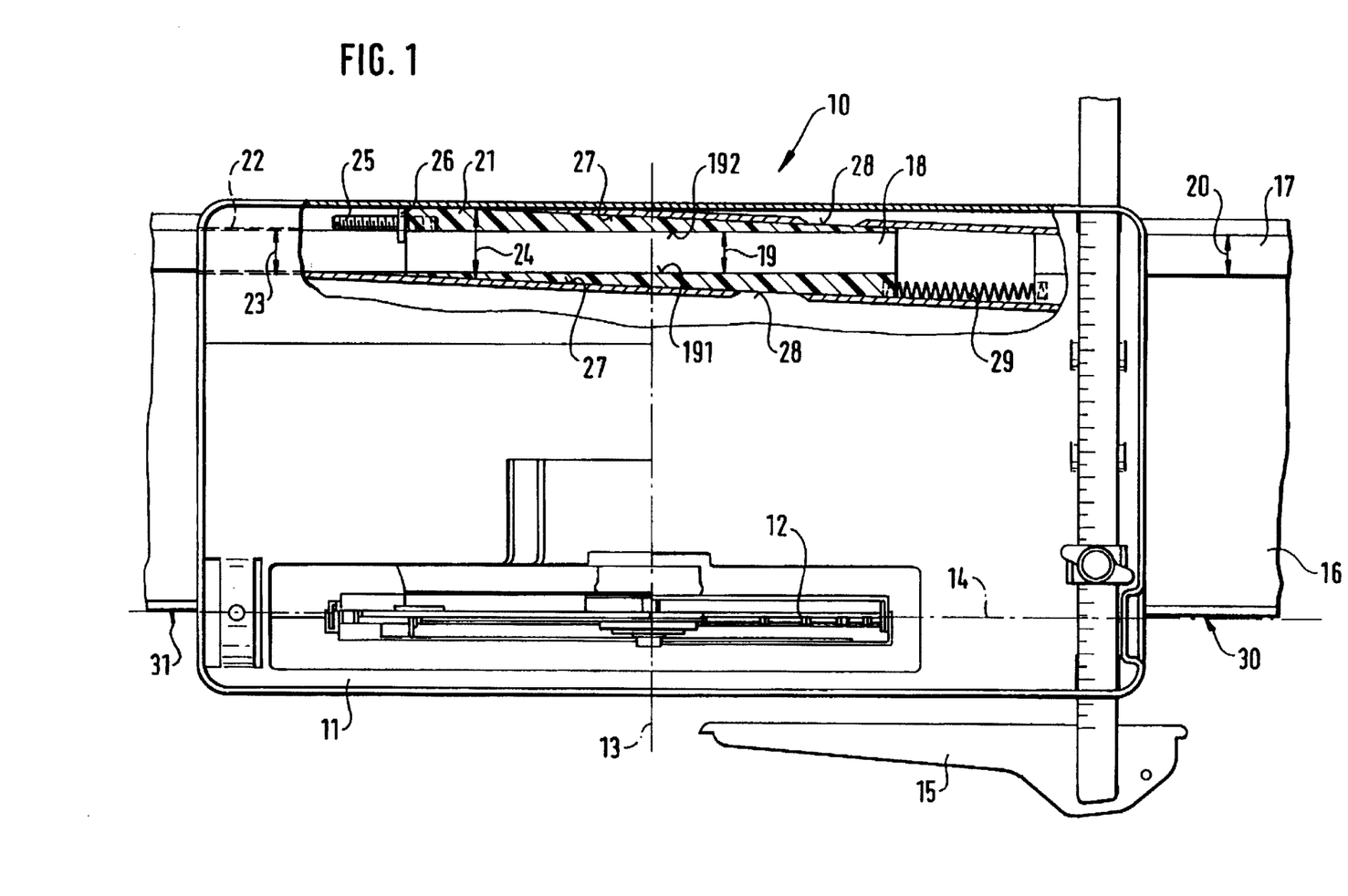
FIG. 1 shows a partially sectional top view of a hand-operated circular saw in accordance with the invention.

The hand-operated circular saw 10, shown in a top view in FIG. 1, discloses a base plate 11 supporting a saw blade 12 with a saw shaft axis 13 and the parts, not described in detail and not shown, such as saw blade housing, motor, drive housing and the like. The normal projection of the saw blade 12 onto the plane of the base plate 11 or the workpiece defines a tool contact line 14. The base plate 11 has a lateral stop 15 which can be adjusted and locked in guide means, not described in detail.

The base plate 11 rests on a guide rail 16. An overlapping guide groove 18 of the base plate 11 has been placed along a guide rib 17 of the guide rail 16 and is supported on both sides thereof. The guide groove 18 with its side faces 191, 192, which determine its width 19, is slightly wider than the guide rib 17, so that a slight transverse play exists between them.

The guide groove 18 is a part of an elongated groove holder 21, which has been inserted as a separate part into a guide channel 22 of the base plate 11 from the direction of the underside of the latter. The width 23 as well as the height of the guide channel 22 correspond to the exterior width 24 or the height of the groove holder 21. The groove holder 21 is disposed in the guide channel 22 lengthwise displaceable by means of an adjustment screw 25. The adjustment screw 25 is rotatably and displaceably maintained on an interior thread element 26 of the base plate 11, and rotatably, but axially fixed on the groove holder 21. In the area where it receives the groove holder 21, the guide channel 22 has sidewalls which are parallel with each other and continuous and extend obliquely in respect to the guide groove 18 in the plane of the base plate. These are used as guide slopes 27 for the exterior walls of the groove holder 21 which are disposed parallel with each other and continuously inclined in respect to the guide groove 18. The exterior walls are used as slide slopes 28.

A guide spring 29, embodied as a pressure spring, is supported on a front face of the groove holder 21 facing away from the adjustment screw 25 and has a restoring effect in respect to the base plate 11.

The parallel linear edge 30 of the guide rail 16 remote from the guide rib 17 is used for placement against a workpiece along the intended path of the cut. A rubber lip 31 is disposed under the guide rail 16, which projects past the linear edge 30 and is used as a chip breaker or workpiece protector and which during sawing prevents splintering at the cutting channel or scratching of the workpiece in the course of displacing the guide rail 16.

Figure 2:
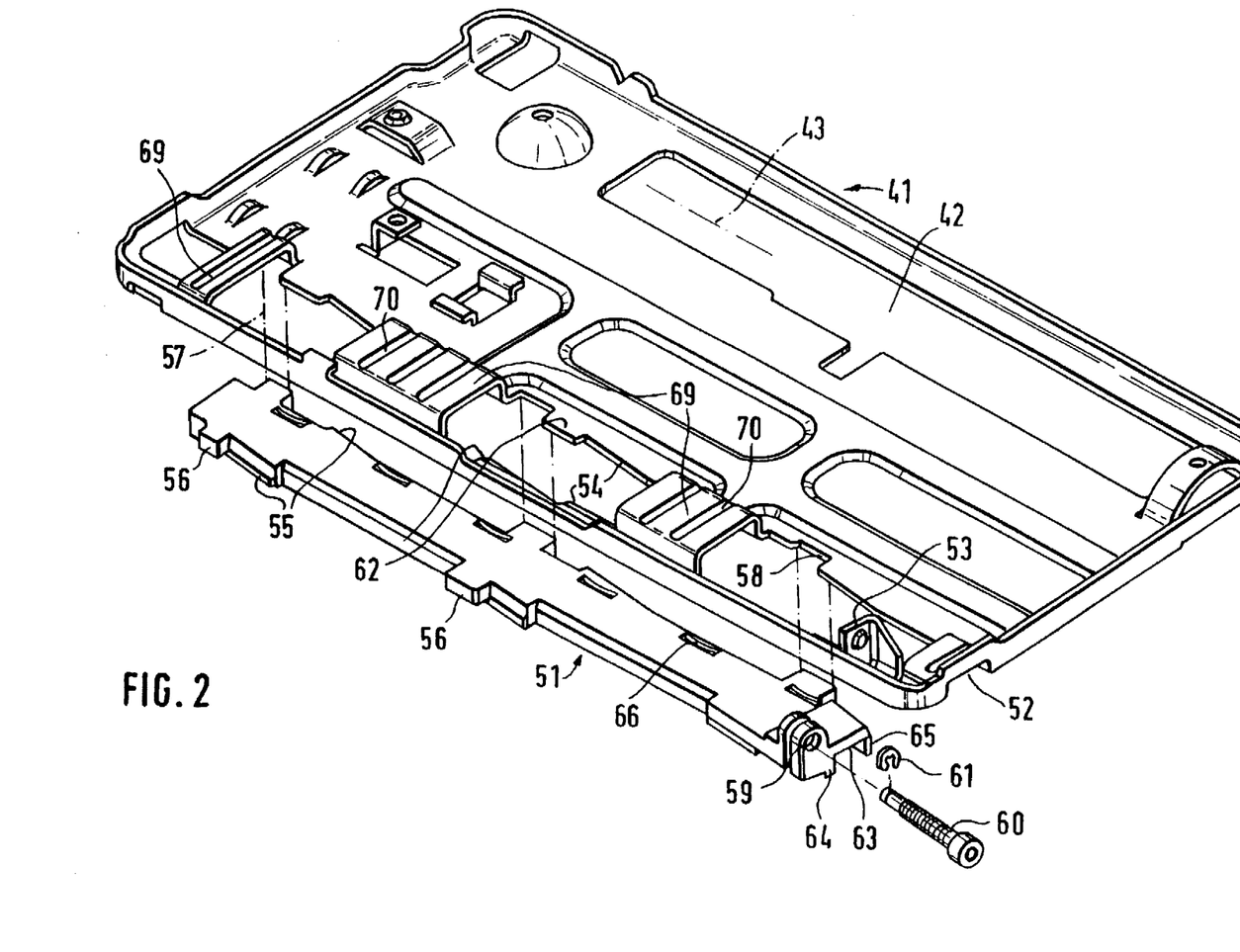
FIG. 2 is an exploded view of the base plate and the groove holder.

A further embodiment of a base plate 41 is shown in FIG. 2. On a long side it has a slit 42 for the passage of a saw blade, not shown. The tool contact line 43, shown in dash-dotted lines, extends therein. A guide channel 52, in which a groove holder 51 with a guide groove 63 with sidewalls 63, 64 is displaceably seated, extends parallel near the other long side. An adjustment screw 60, which is connected axially non-displaceable with the groove holder 51, is seated in an interior thread element 53 of the base plate 41 in a spindle-like manner. The guide channel 52 is formed by a recess which is bridged several times by means of bridges 69.

The sidewalls of the guide channel 52 are provided with step-like guide slopes 54, on which the slide slopes 55 of the groove holder 51 are supported along a predetermined displacement path.

The slide slopes 55 of the groove holder 51 are arranged discontinuously step-like in the same way. The structural width of the groove holder 51 has been reduced to a minimum by means of a parallel offset of the wedge-like lateral projections supporting the slide slopes 55. The groove holder 51 is furthermore provided with block-like projecting supports 56 on both sides. The groove holder 51 is introduced with these supports 56 into the base plate 41 along the normal mounting line 57, drawn in dashed lines, through cutouts 58 and is then displaced toward the right in the direction of viewing. The supports 56 then respectively rest with their base surfaces on a projection 62. The groove holder 51 is secure in this manner against being lost or downwardly removed. On the right side in the direction of viewing, the groove holder 51 has a seating bore 59 in which the adjustment screw 60 is rotatably seated, secure against axial displacement by means of a securing plate 61.

The bridges 69 of the guide channel 52 are provided with slide beads 70 on which the groove holder 51 is supported, wherein the contact face between the base plate 41 and the groove holder 51 is reduced. In the sidewall 65 and parallel with it, the groove holder 51 has the punched-out holes 67 which penetrate the groove bottom. The arched leaf springs 68, to be described further in FIG. 4, which are formed by the curved punched-out openings 66, are formed by these in the sidewall 65 and elastically limit the width of the guide groove 63.

Figure 3:
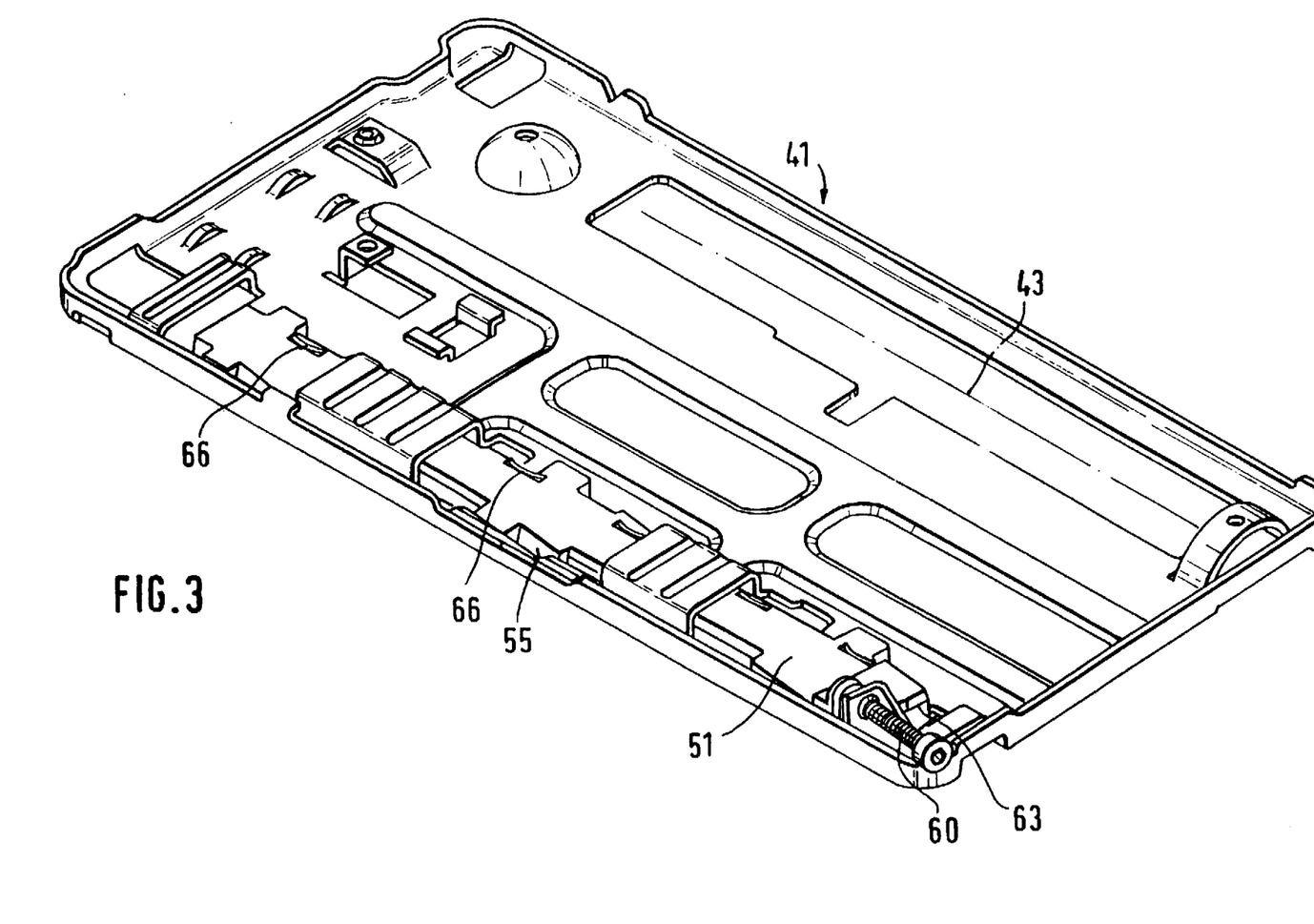
FIG. 3 is a top view of the base plate with the groove holder inserted.

The base plate 41 with the installed groove holder 51 as described in connection with FIG. 2 is shown in FIG. 3 in its position in which it is farthest displaced toward the right in the viewing direction. Here the guide groove 63 has its greatest distance in respect to the tool contact line 43. Applied to FIG. 1 it follows from this that in this position of the groove holder 21 in respect to the base plate 11, the saw blade 12 also has its greatest distance in respect to the linear edge 29 of the guide rail 16.

Figure 4:
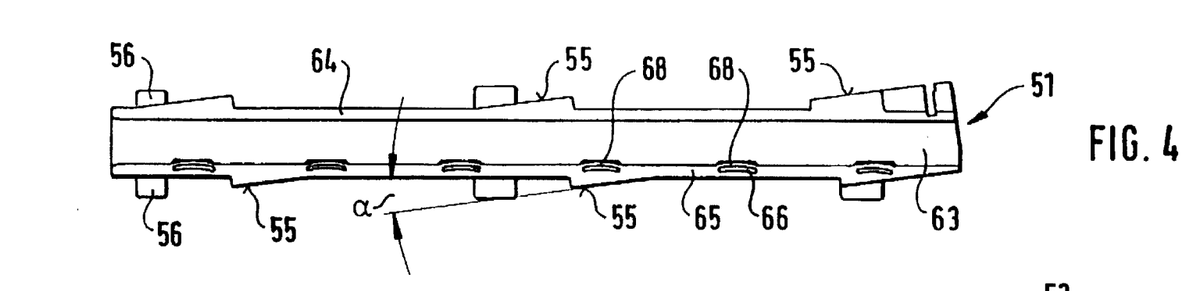
FIG. 4 shows a groove holder seen from below.

A groove holder 51 in accordance with FIGS. 2 and 3 is shown, seen from below, in FIG. 4. It is possible to see the guide groove 63, the sidewalls 64, 65, provided with slide slopes 55 in a step-like manner and arranged at an angle in respect to the groove 63, as well as the supports 56 and the curved punched-out openings 66 through the wall of the groove bottom with the punched-out holes 67 in the sidewall 65 of the groove holder 51 and the leaf springs 68 are visible. A thin-walled area of the sidewall 65 remains between the punched-out holes 67 and the guide groove 63 in the manner of a forward-arched leaf spring 68.

Figure 5:
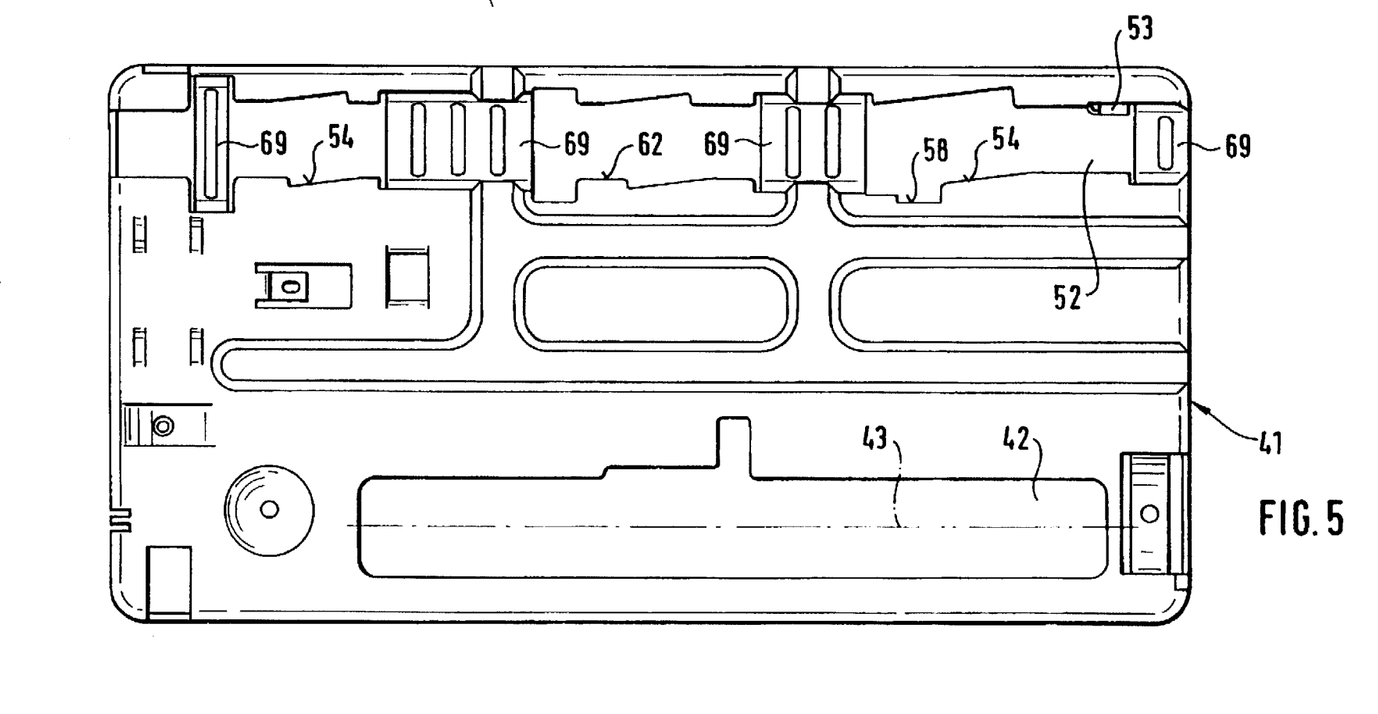
FIG. 5 shows a base plate seen from below.

The view, shown in FIG. 5, of the base plate 41 from below with the slit 42, the tool contact line 43, the guide channel 52 for receiving the groove holder 51, the interior threaded element 53, the multiple bridges 69, the step-like interrupted sidewalls of the guide channel 52 with guide slopes 54, the cutouts 58 and the projections 62.

Figures 6, 7:
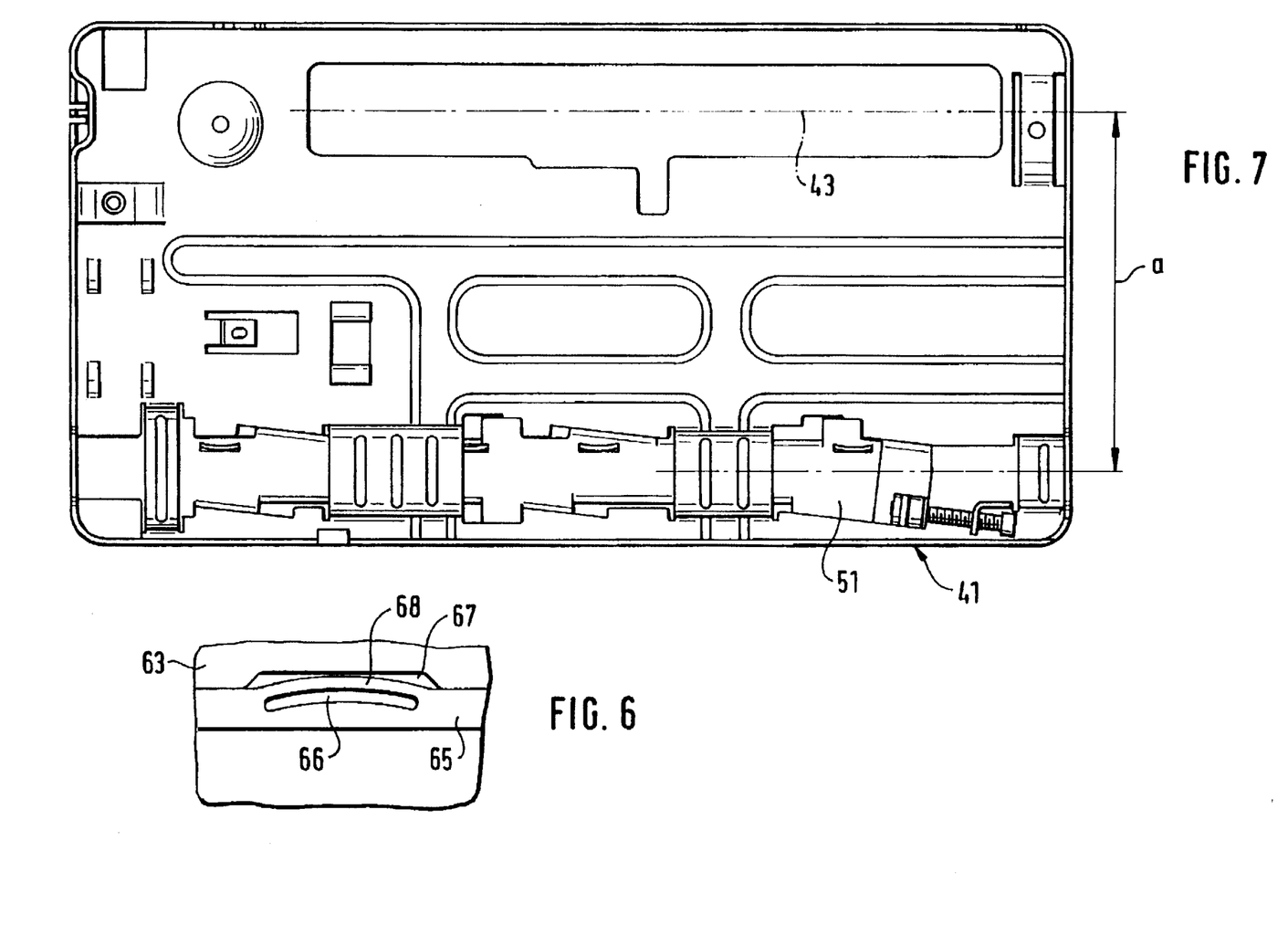

A portion of the groove holder 51 is shown in FIG. 6, wherein a curved punched-out opening 66 with a punched-out hole 67 of the sidewall 65 and the guides 63 are shown enlarged. The curved punched-out opening 66 is visible in the sidewall 65, and the punched-out hole 66 in the groove bottom. The punched-out hole 66 causes the leaf spring 68 to be movable in respect to the groove bottom.

Figures 8, 9:
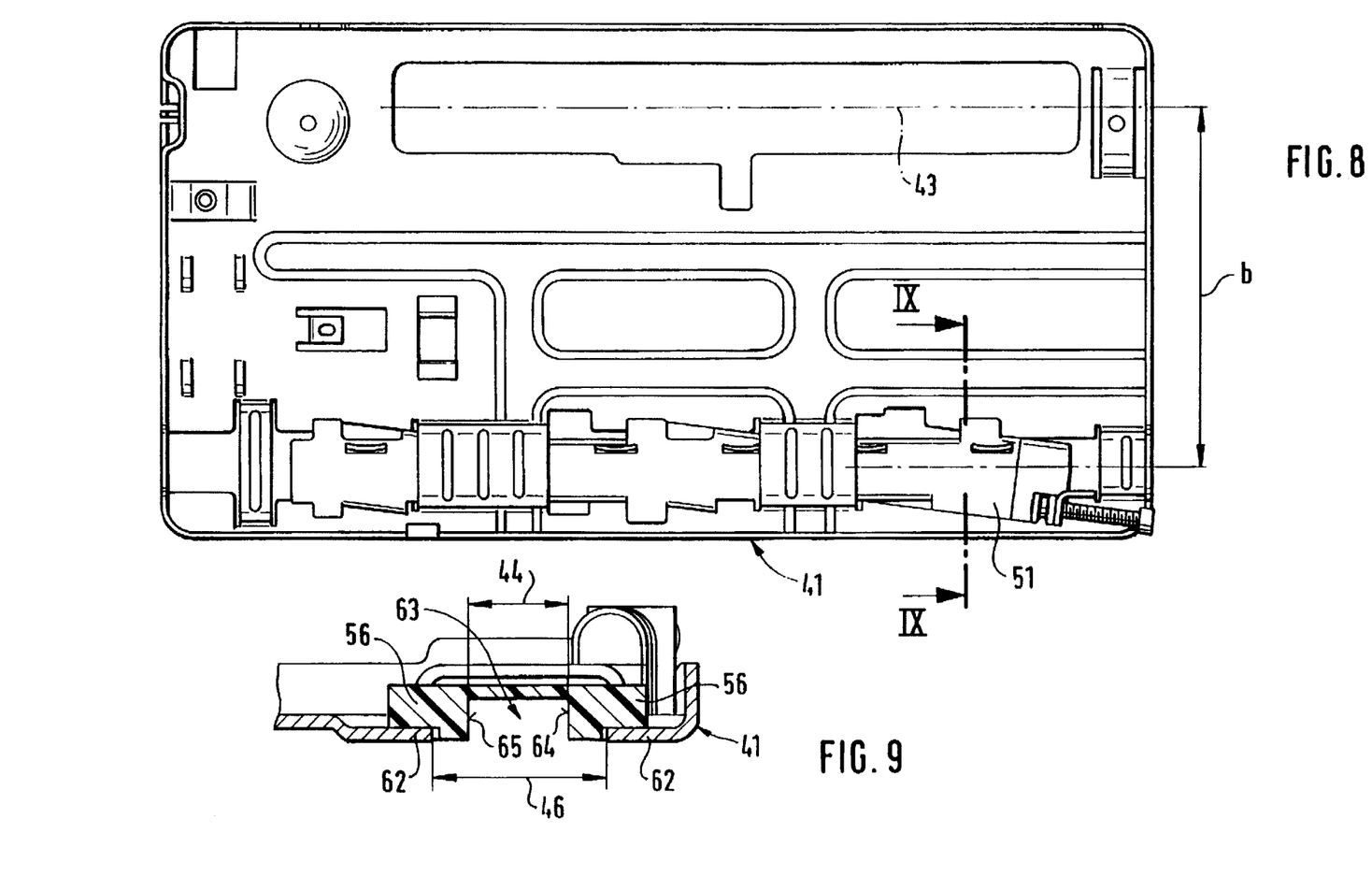

In FIGS. 7, 8 the base plate 41, viewed from above, can be seen as a detail, with the groove holder 61 in the respectively opposite positions, wherein the distances a, b of the guide groove center in respect to the tool contact line 43 has the respectively opposite extreme values.

The profile of the base plate 41 with the groove holder 51 inserted is shown in FIG. 9 along the section IX—IX of FIG. 8. It can be seen here that at the underside of the base plate 41 the guide channel 52 is broader than the groove holder 51 or than the guide groove 63 in the area of the protrusions 62, too.

The adjustment of the position of the guide groove 18, 63, i.e. of the groove holder 21, 51 in respect to the base plate 11, 41 is performed as follows: the groove holder 21, 51 is displaced linearly with the guide channel 22, 52 in respect to the base plate 11, 41 by turning the adjustment screw 25, 60. In the process, the slide slopes 28, 55 (or the exterior wall) of the groove holder 21, 51 slide obliquely in the guide channel 22, 52 along the guide slopes 27, 54 (or the sidewalls of the channel). The guide groove 18, 63 always remains oriented parallel with the initial position. In the course of this linear stroke the groove holder 21, 51 or the guide groove 18, 63 undergoes a transverse stroke. The transverse stroke is a function of the angle of the guide slopes 54 or the slide slopes 55. The greater the angle (FIG. 4), the greater the portion of the oblique displacement in the course of the linear displacement of the groove holder 21, 51.

The guide groove 18, 63 in the groove holder 21, 51 can be manufactured with comparatively large tolerances, without the play between the guide groove 63 and the guide rib 17 of the guide rail 16 becoming too great. This is achieved by means of the leaf springs 68 laterally projecting into the guide groove 18, 63, which are formed in the sidewall 65 by means of punched-(out) holes 66, 67.

The separate groove holder 21, 51 can be easily changed if the guide groove 63 or the leaf springs 68 should become worn.

For example, it is possible to make available several interchangeable groove holders of different width of the guide groove, which fit the commercially available guide rails 16 with guide ribs 17 of different width.

Hand-operated power tools equipped with groove holders in accordance with the invention, which can also be precisely adjusted in respect to a guide rail, keep their initial value for the user over long periods of time. A tolerance adjustment following a saw blade change can be achieved with little effort by adjusting the groove holder.

In an exemplary embodiment of the invention, not shown, the groove holder can be displaced by means of a rapid displacement device into two predetermined positions, wherein the transverse stroke approximately corresponds to the width of a saw blade. In addition, the groove holder is disposed unsupported and projecting to the outside on one side of the base plate.

In the first displacement position of the groove holder, the saw blade can be used for pre-notching—for example a veneered or laminated surface.

In a further exemplary embodiment of the invention, not shown, the guide channel for the groove holder can be designed in such a way that adjusting screws, for example grub screws, are inserted into its sidewalls, with whose aid the groove holder or the guide groove axis can be adjusted in respect to the base plate. Because of this it is possible to select the manufacturing tolerances of the base plate and the groove holder to be larger, without the accuracy of the groove position being hampered by this.

In another exemplary embodiment of the invention, not shown, the groove holder can be coupled with the miter angle adjustment. If now the miter angle is changed, the position of the groove holder also changes. This is practical in connection with hand-operated circular saws where the pivot axis is disposed above the underside of the base plate, since in this case the tool contact line changes as a function of the miter angle. The change of the tool contact line is compensated by this. Because of this it is possible to use a single, fixedly set cutting sight for all miter angles. It is possible to produce miter cuts with an improved accuracy of aim.

Means are provided by the invention with whom it is possible to adjust the position of the saw blade in respect to the guide rail in a simple manner in such a way, that the tool contact line extends at the optimal distance parallel with the linear edge of the guide rail. Because of this the linear edge or the rubber lip of the guide rail can optimally perform its function as a chip breaker or splinter guard.

Cutting an intentionally oversized projecting rubber lip on the linear edge of the guide rail to size to fit the respective amount of distance in known hand-operated circular saws, and the dependency of the match between the hand-operated power tool and the guide rail has been removed. All hand-operated power tools in accordance with the invention can be adjusted together on one guide rail. There is no longer a necessity of using separate guide rails for several hand tools or makes of hand tools.

If it is intended to achieve as large as possible a lateral displacement parallel with the groove axis in case of a shorter displacement path of the groove holder, the angle (FIG. 4) of the slide slopes or the guide slopes must be selected to be steeper.

The base plate can be economically produced as a stamped sheet metal part, wherein the guide channel is disposed in such a way that, following stamping and bending of the base plate, the guide slopes for the groove holder are produced with end measure quality in a final stamping.

The leaf springs integrated into the groove holder, which elastically restrict the guide groove and are formed by curved cutouts, in particular punched-out holes, in at least one of its sidewalls, can be produced without additional cost by the design of the press or casting tool of the groove holder.

The groove holder is supported in the base plate free of play and with low friction by means of rail-like slide beads on the bottom surface of the guide channel or on the back of the groove holder.

It is advantageous to produce the groove holder convexly or concavely along the groove axis, so that the groove holder is maintained with leaf spring-like prestress and secure against vibration and loss in the base plate.

The invention can be advantageously employed in connection with all manually guided machine tools, for example also with saber saws, routing machines, shadow joint milling cutter, tackers, rodents, and the like.

We claim:

1. A hand-operated power tool arrangement, comprising a power tool having a base plate; means for guided displacement of said power tool on a workpiece, said means for guided displacement including a guide rail with a guide rib and a guiding means associated with said base plate, said guiding means being formed as a single groove holder provided with a single guide groove which overlaps said guide rib, said single groove holder being separate from said base plate and secured against loss, said single groove holder and said base plate being formed so that when said single groove holder is displaced in at least one direction in a plane of said base plate, said single groove holder is also displaced transversely to said at least one direction.

2. A hand-operated power tool as defined in claim 1, wherein said single groove holder is displaceable in the plane of said base plate transversely to said single guide groove.

3. A hand-operated power tool as defined in claim 1, wherein said base plate has a surface facing said guide rail and supports said single groove holder on said surface.

4. A hand-operated power tool as defined in claim 1, wherein said base plate has a surface which forms a guide channel having interior sides which are substantially congruent with exterior sides of said single groove holder.

5. A hand-operated power tool as defined in claim 4, wherein said guide channel is formed by a bridged cutout in said base plate.

6. A hand-operated power tool as defined in claim 4, wherein said guide channel has slide beads on which said single groove holder is supported.

7. A hand-operated power tool as defined in claim 1, and further comprising means for displacing said groove holder relative to said base plate and including a screw drive arranged on said base plate.

8. A hand-operated power tool as defined in claim 1, wherein said groove holder is an elongated element composed of an elastic plastic material and having a U-shaped cross-section.

9. A hand-operated power tool as defined in claim 4, wherein said guide channel of said base plate has sides, said groove holder having an axis and at least one exterior linear edge which is formed as a slide slope extending at least partially angled in a plane of said base plate with respect to said axis of said groove holder and supported on said sides of said channel.

10. A hand-operated power tool as defined in claim 1; and further comprising spring means arranged between said guide groove and said guide rib and projecting into said guide groove.

11. A hand-operated power tool as defined in claim 10, wherein said spring means are spring elements which are integral in said groove with said groove holder and formed by curved cutouts in at least one side wall of said groove holder.

12. A hand-operated power tool as defined in claim 11, wherein said curved cutouts are punched-out openings.

13. A hand-operated power tool as defined in claim 11, wherein said curved cutouts are punched-out holes.

14. A hand-operated power tool as defined in claim 1; and further comprising an adjusting screw for adjusting said groove holder, said groove holder, said base plate, said adjusting screw forming three elements, at least one of said elements being provided with means for position control which formed as a graduation.

15. A hand-operated power tool as defined in claim 14, wherein all said three elements are provided with said means for position control.

16. A groove holder as defined in claim 4, wherein said base plate has a cutout which is used as said guide channel and which is wider than said guide rib of said guide rail.

17. A groove holder for a base plate, comprising a single separate element composed of an elastic plastic material and having a single guide groove supportively extendable over a guide rib of a guide rail, said separate element being provided with support means formed on an outer side of said separate element so as to be supported on a base plate when said separate element is inserted into the base plate, said support means and said single separate element being formed so that in a course of a linear stroke of said separate element in at least one direction said separate element performs a transverse stroke which is transverse to said at least one direction.

18. A groove holder as defined in claim 17, wherein said support means include projections.

19. A groove holder as defined in claim 17, wherein said support means include slide slopes.

20. A groove holder as defined in claim 19, wherein said slide slopes are formed so that when they slide up on corresponding guide slopes of the base plate, and the linear stroke is greater than the transverse stroke.

21. A groove holder as defined in claim 17, wherein said separate element has integrated leaf springs projecting into said guide groove.

* * * * *